April 25, 1933. W. S. VROOMAN 1,905,769
AUTOMOBILE RUNNING BOARD AND THE LIKE
Filed June 1, 1928
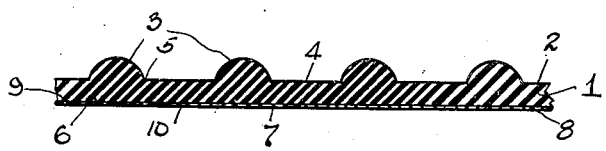
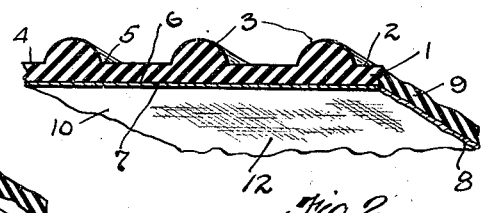
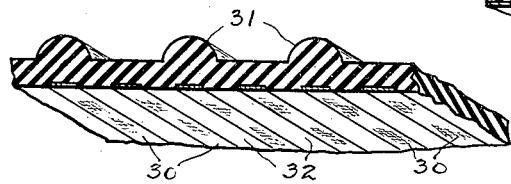
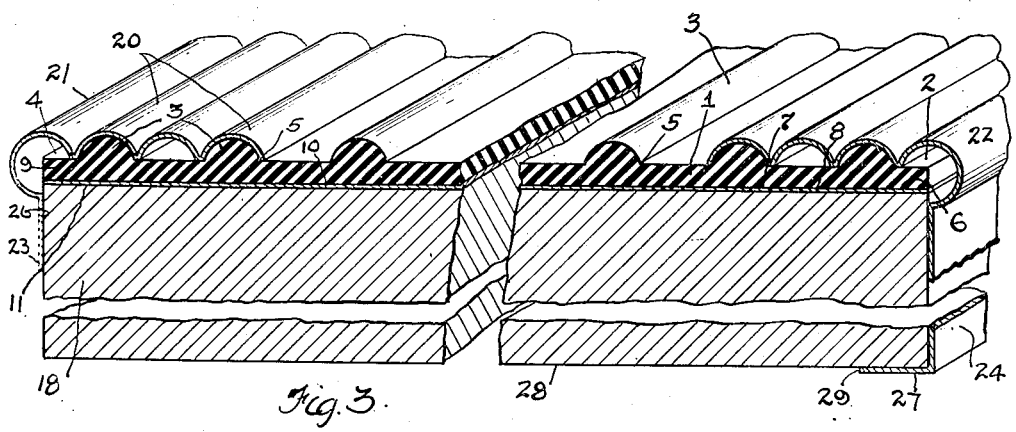
INVENTOR.
William S. Vrooman
BY
Fay, Oberlin & Fay
ATTORNEYS.

Patented Apr. 25, 1933

1,905,769

UNITED STATES PATENT OFFICE

WILLIAM S. VROOMAN, OF CLEVELAND, OHIO, ASSIGNOR TO THE PAINE AND WILLIAMS COMPANY, OF CLEVELAND, OHIO, A CORPORATION OF OHIO

AUTOMOBILE RUNNING BOARD AND THE LIKE

Application filed June 1, 1928. Serial No. 282,086.

This invention, relating, as indicated, to automobile running boards and the like, has more particular reference to tread members or covering materials and their manufacture. Its principal object is the provision of a tread member or covering material for automobile running boards, steps and other surfaces that should be overlain with a resilient, non-buckling and slip-proof mat, and it comprises a layer or sheet of rubber or rubber-like composition having secured to one of its faces a relatively inextensible and stiff but slightly flexible second reinforcing layer or sheet of some fibrous substance, such as paper, the rubber and the paper being permanently bonded to each other and the exposed face of the paper being desirably configurated or roughened to facilitate and improve its attachment to the upper surface of running boards and the like in case attachment by cementation or otherwise is desired; it being understood that ordinarily the paper backing will stiffen the superposed rubber sufficiently to compel the mat as a whole to lie flat initially and remain so during its period of use so that it may not be necessary to cement the bottom of the paper to the top surface of the supporting base upon which it rests in order to obviate buckling, wrinkling and creeping of the mat with relation to such base.

To the accomplishment of the foregoing and related ends, said invention, then, consists of the means hereinafter fully described and particularly pointed out in the claims. The annexed drawing and the following description set forth in detail one method and one type of product exemplifying my invention, such disclosed procedure and type of product constituting, however, but one of several applications of the principle of my invention.

In said annexed drawing:—

Fig. 1 is a vertical section showing a covering material embodying my improvements; Fig. 2 is a sectional perspective view showing the under side of the lowermost layer shown sectionally in Fig. 1; Fig. 3 is a sectional perspective view showing the top side or exposed face of the rubber and the manner of attaching the mat to an automobile running board or other surface; Fig. 4 is a sectional perspective view showing the under side of a modified form of my improved covering material; Fig. 5 is a vertical section through the modification of Fig. 4; and Fig. 6 is a sectional perspective view of a further modified form employing fibrous strips.

In the drawing, and with particular reference to Figs. 1, 2 and 3, my invention is shown as comprising a tread member 1, which is preferably formed of rubber or rubber-like material of such thickness and composition as to impart the desired degree of resilience or softness to the mat. The upper side or exposed face 2 of this tread member may be smooth but, to accentuate its non-skid characteristics, it is usually roughened or molded in some definite pattern. As shown, it is provided with spaced, parallel and longitudinally extending ridges or corrugations 3 and intermediate flats 4; these corrugations desirably forming rather sharply defined angles 5 with the flats 4, being substantially semi-circular in cross-sectional shape and having an extreme width exceeding twice their extreme height and being spaced from each other a distance of about one and one-half times their extreme width; and the intermediate flats 4 preferably having a vertical thickness that is less than the extreme width of the corrugations. A surface design of this description is durable, safe and pleasing in appearance while yet requiring, as compared with other possible configurations or designs, a relatively small quantity of material for its formation.

To the under side 6 of the tread member 1 is attached the contiguous face 7 of a sheet of paper 8, this paper being preferably of kraft or other heavy, tough, durable and water-repelling variety in its natural and untreated condition for providing for the superposed layer of rubber 9 an inextensible, rather stiff but somewhat flexible backing that facilitates the manufacturing operations, such as molding and vulcanizing of the corrugations 3 and flats 4, prevents wrinkling or buckling of the rubber when lying flat upon a running board or the like, generally improves the mats, especially in regard to their cost of manufacture, and presents an upper face 7 which can be easily and firmly attached to the lower face 6 of the rubber 9 during its molding and vulcanization, and a lower face 10 which can be securely attached, as by cementing, to the upper surface 11 of a running board, in case attachment between such surfaces is desired; my invention contemplating that the paper backing alone will usually be effective in preventing buckling, while the mechanical means, preferably used in fastening down the edges, will secure the mat against creeping.

In manufacturing my improved covering material, the prepared crude rubber or a generally similar composition may be deposited or applied as by calendering or otherwise upon the upper face 7 of a sheet or web of paper 8, such paper, during this depositing and succeeding operations, being supported from beneath in any desired manner and upon any suitable material, either smooth or rough, rather coarsely woven cloth or fabric being usually employed. Thereafter, the supporting cloth (not shown), the paper 8 and the rubber (or successive sections of these) are positioned in, or passed through, a machine which firmly presses the rubber onto the face 7 of the paper 8, molds the corrugations 3 and flats 4 into, or on, the upper surface 2, and simultaneously or later vulcanizes the rubber to set the resulting surface design and permanently secure its under side 6 to the upper side 7 of the paper 8. As above explained, the paper 8, during the molding and vulcanization of the rubber, may be supported upon a rather coarsely woven cloth; this method of support, where adopted, results in configurating or embossing the paper with depressions and elevations 12 that are reverse impressions of the corresponding cloth features, which improve the bond obtained between the inner surface 7 of the paper and the lower surface 6 of the rubber, and also make it easier, if desired, to dependably bond its outer face 10 to a running board or other surface. It will be apparent that if the paper 8 is supported upon a smooth surface during the above described operations, it will retain its normal smoothness, while if supported upon a surface having a superficial roughness of a different nature than the commonly used cloth, the paper will be correspondingly impressed.

In Figs. 4 and 5 the paper 13 is shown provided with a multiplicity of small holes or perforations 14, these holes being of any shape, round for example, and either cleanly cut out or simply punched through without removing any of the paper, and providing, if numerous enough, say ¼ of an inch in diameter, and ½ of an inch from center to center, a foraminate or net-like skeleton to which the rubber 15 may anchor and form friction plugs as shown at 16 in Fig. 5, the paper 17 remaining between the holes or perforations serving to impart the desired inextensibility, stiffness and flexibility, and provide a surface that can be readily attached to a base by the use of glue or other adhesives.

One method of attaching my improved matting to a surface, such as an automobile running board, is illustrated in Fig. 3. In this view the matting, which may be any of the three forms shown respectively in Figs. 1 and 2, in Figs. 4 and 5, and in Fig. 6, is shown superposed upon a board or the like 18, the lower face 10 of the paper 8 being cemented to the upper surface 19 of the board, if desired, and one or more of the extreme outer corrugations 3 on each side of the rubber 9 being enclosed or overlapped by the similarly shaped corrugations 20 of the nosings or binders 21 and 22 which have downwardly extending parts 23 and 24 that may be secured to the vertical sides 25 of the board 18 as at 26, or turned under as at 27, and secured to the lower face 28 as shown at 29. As heretofore mentioned, the paper 8, due to its inextensibility, will usually be sufficient to prevent buckling, but cement may be used between the paper and the board, if desired, the paper, in case an adhesive is used, forming a surface which the glue or cement used can grip tenaciously to additionally secure the mat against buckling and creeping. However, ordinarily the nosings 21 and 22 combined with the roughness of the paper and the exposed faces of the friction plugs 16, if present, will serve to prevent creeping without the necessity of employing an adhesive. Means other than the binding strips or nosings 21 and 22 may be used in attaching my improved matting to the tread surface of a supporting base, if desired, and, in case other means are used, the corrugations 3, to improve their foot-gripping action, are preferably so disposed as to extend transversely of the direction in which the mat is usually trodden upon, as shown in Fig. 3.

A further modification is illustrated in Fig. 6 wherein a mat which is generally similar to those previously described is shown as provided with reinforcing strips 30, these strips being conveniently formed of a fibrous material such as paper, or the like, and preferably extending lengthwise of the mat or parallel to the corrugations 31. Their under sides may be substantially flush with the intervening rubber 32 and each strip is desirably independent of the others and spaced therefrom a distance which imparts the desired inextensibility and stiffness, say, one-quarter or three-eighths of an inch, the strips themselves having any desired width as, for example, three-eighths of an inch. A matting constructed in this manner may be attached in about the same way as those previously described and when so attached the intermediate strips of rubber 32 will have substantially the same action as the friction plugs 16 while the embedded paper will prevent buckling and creeping.

Other forms may be employed embodying the features of my invention instead of the one here explained, change being made in the form or construction, provided the elements stated by any of the following claims or the equivalent of such stated forms be employed, whether produced by my preferred method or by others embodying steps equivalent to those stated in the following claims.

I therefore particularly point out and distinctly claim as my invention:—

1. As an article of manufacture, a covering material for automobile running boards and the like, comprising sheets of rubber and paper vulcanized together, the paper being exposed at the under side of such article.

2. As an article of manufacture, a covering material for automobile running boards and the like, comprising sheets of rubber and embossed paper bonded together by vulcanization, the paper being exposed at the under side of such article.

3. As an article of manufacture, a covering material for automobile running boards and the like comprising bonded sheets of rubber and embossed paper vulcanized together, the paper being exposed at the under side of such article.

4. As an article of manufacture, a covering material for automobile running boards and the like comprising sheets of rubber and perforated paper vulcanized together, the paper being exposed at the under side of such article.

5. As an article of manufacture, a sheet of rubber vulcanized to a sheet of paper, said paper being perforated and said rubber extending through such perforations.

6. As an article of manufacture, a sheet of rubber vulcanized to a sheet of paper, said paper being perforated and said rubber extending through such perforations to form plugs, said plugs being flush with the exposed surface of said paper.

Signed by me, this 28th day of May, 1928.

WILLIAM S. VROOMAN.